(12) United States Patent
Braun et al.

(10) Patent No.: US 6,720,703 B1
(45) Date of Patent: Apr. 13, 2004

(54) ELECTRICAL MACHINE

(75) Inventors: Horst Braun, Stuttgart (DE); Hans-Joachim Lutz, Lampertheim (DE); Dieter Willms, Heilbronn (DE); Jérome Debard, Cardiff (GB); Anne Perrin-Bonnet, Llantwit Fardre (GB)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/890,494

(22) PCT Filed: Nov. 15, 2000

(86) PCT No.: PCT/DE00/04028

§ 371 (c)(1),
(2), (4) Date: Oct. 12, 2001

(87) PCT Pub. No.: WO01/41284

PCT Pub. Date: Jun. 7, 2001

(30) Foreign Application Priority Data

Dec. 4, 1999 (DE) .......................................... 199 58 503

(51) Int. Cl.[7] ................................................ H02K 1/24
(52) U.S. Cl. ........................................................ 310/263
(58) Field of Search .......................... 310/263, 42, 51; 29/596–598

(56) References Cited

U.S. PATENT DOCUMENTS

| | | | | |
|---|---|---|---|---|
| 3,230,404 A | | 1/1966 | Graham | 310/263 |
| 4,617,485 A | * | 10/1986 | Nakamura et al. | 310/263 |
| 5,483,116 A | * | 1/1996 | Kusase et al. | 310/263 |
| 5,519,277 A | | 5/1996 | York | 310/263 |
| 5,536,987 A | | 7/1996 | Hayashi | 310/263 |
| 6,002,194 A | * | 12/1999 | Asao | 310/269 |
| 6,144,138 A | * | 11/2000 | Ragaly | 310/263 |
| 6,157,111 A | * | 12/2000 | Asao | 310/263 |

FOREIGN PATENT DOCUMENTS

| | | |
|---|---|---|
| EP | 0 720 275 B1 | 7/1998 |
| GB | 1 104 435 A | 2/1968 |

* cited by examiner

*Primary Examiner*—Tran Nguyen
(74) *Attorney, Agent, or Firm*—Michael J. Striker

(57) ABSTRACT

An electrical machine with a rotor (10), in particular a claw pole rotor, is proposed. The rotor (10) has an exciter system of electrically excited individual poles in the rotor (10), in the form of electromagnetically excited poles (28) and counterpart poles (34). A pole gap closure (55) is placed between the poles (28) and counterpart poles (34), which alternate on the circumference of the rotor (10), and at least partly fills the open spaces. The pole gap closure (55) is characterized in that it is braced by at least one of its axial end regions (61), via projections (64), on pole roots (37; 31).

7 Claims, 2 Drawing Sheets

ELECTRICAL MACHINE

PRIOR ART

Figure 1:
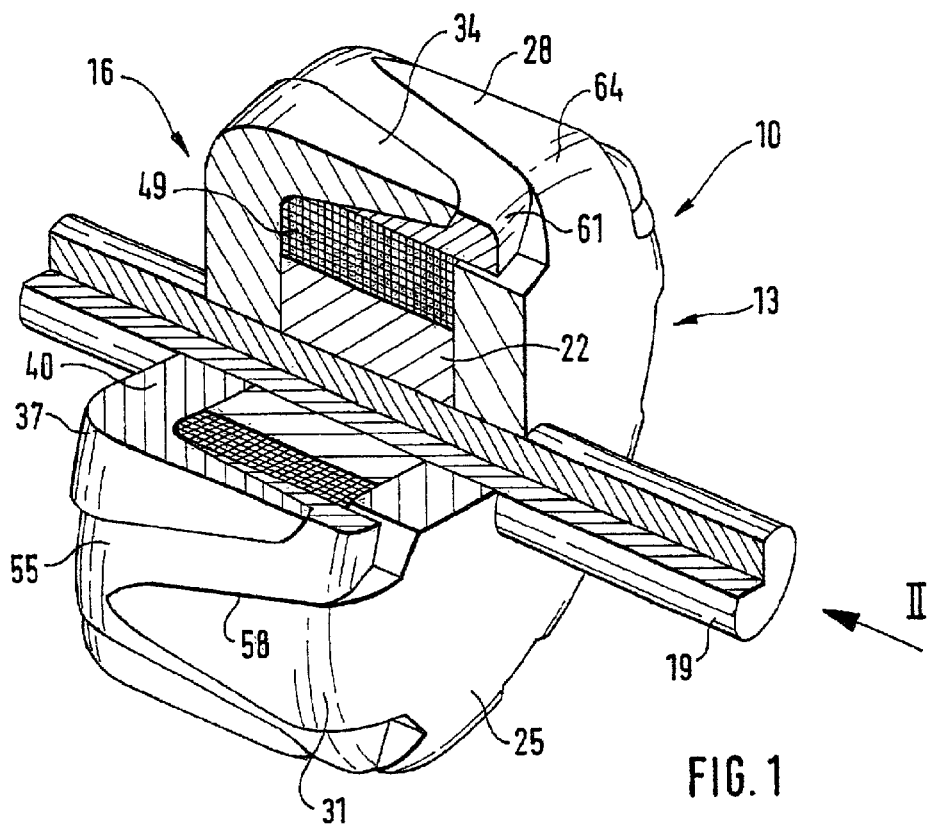

The invention relates to an electrical machine, in particular a claw pole generator for motor vehicles, as generically defined by the preamble to the independent claim.

Electrical machines for motor vehicles are known from European Patent EP 0 720 275, for instance. The known electrical machine includes a rotor of the claw pole type, which comprises among other elements a shaft, two pole wheels, an exciter coil, and a pole closure. The pole closure is embodied such, that it closes the interstices of the claw poles of opposite polarity; that no flow is detached on the radially outer, approximately axially oriented edges of the poles and thus prevents the attendant noise production. The claw closure is also embodied such that a substantial portion of its centrifugally acting intrinsic load is transmitted to the claw pole tips via the inside of these tips.

This known electrical machine has the disadvantage, among others, that by the absorption of the centrifugal load of the claw closure via the claw poles, an additional load is exerted on the claw poles in addition to their intrinsic load.

ADVANTAGES OF THE INVENTION

With the electrical machine of the invention as defined by the characteristics of the independent claim, it is possible to transmit the intrinsic centrifugal load of the claw closure to the pole wheels in such a way that the poles and counterpart or opposite poles are not loaded. To that end, it is provided that the pole closure is braced by at least one of its axial end regions, via projections, on the pole roots.

By the provisions recited in the dependent claims, advantageous refinements of and improvements to the characteristics disclosed in the independent claim are obtained.

In the region of the axial end regions, the pole closure has recesses, into which the projections of the pole roots are fitted. This has the advantage that an essentially cylindrical surface of the rotor is thus obtained.

Because the pole wheels are produced by a reshaping process, it is advantageous if the projections are likewise fabricated by reshaping.

In a further feature of the invention, between at least one end region of the pole closure and at least one throat between two pole roots, an opening remains recessed out toward a space radially inside the poles and counterpart poles. This recessing makes a better inflow of an impregnating resin for fixing the exciter coil possible.

So that the air flow will not detach at the transition from the outward-oriented surfaces of the poles and counterpart poles to the pole closure, the transition between the surfaces and counterpart poles of the pole closure and the poles and counterpart poles must be effected in infinitely graduated fashion.

To obtain better intrinsic stiffness of the pole closure, the closure regions of the pole closure are joined together by a ring. A further improvement in the pole closure is obtained by providing that a region between the ring and an end region of the pole closure is closed by a face element.

So that the pole closure between two projections at the pole roots will not be subjected to overly severe bending stress, the face element in a further feature of the invention should be braced on a radially inward-oriented underside of a pole or counterpart pole.

DRAWINGS

Figure 2:
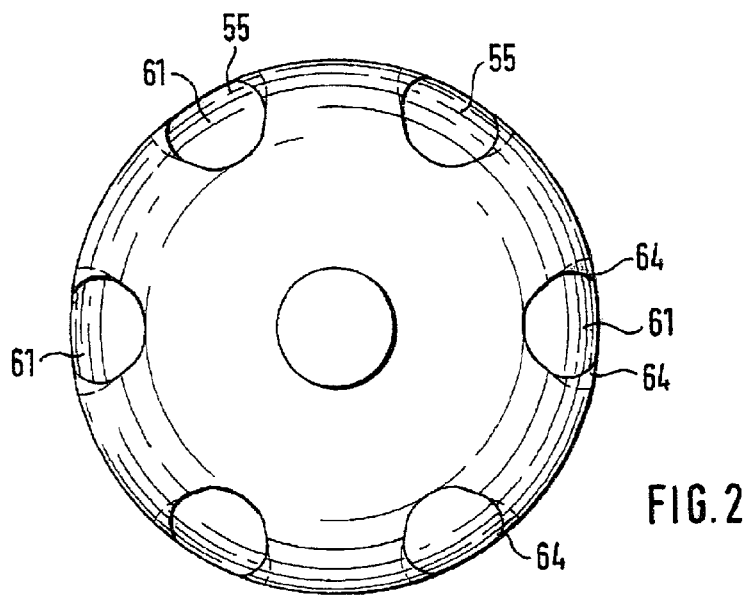
Figure 3:
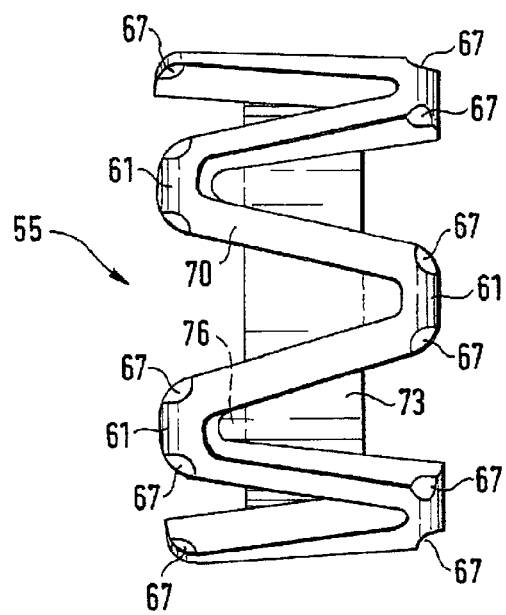

The invention will be described in further detail below in terms of an exemplary embodiment in conjunction with the associated drawings. Shown are:

FIG. 1, a perspective view of a rotor of an electrical machine of the invention;

FIG. 2, an axial view of a pole wheel;

FIG. 3, a side view of a claw closure of the invention; and

Figure 4:
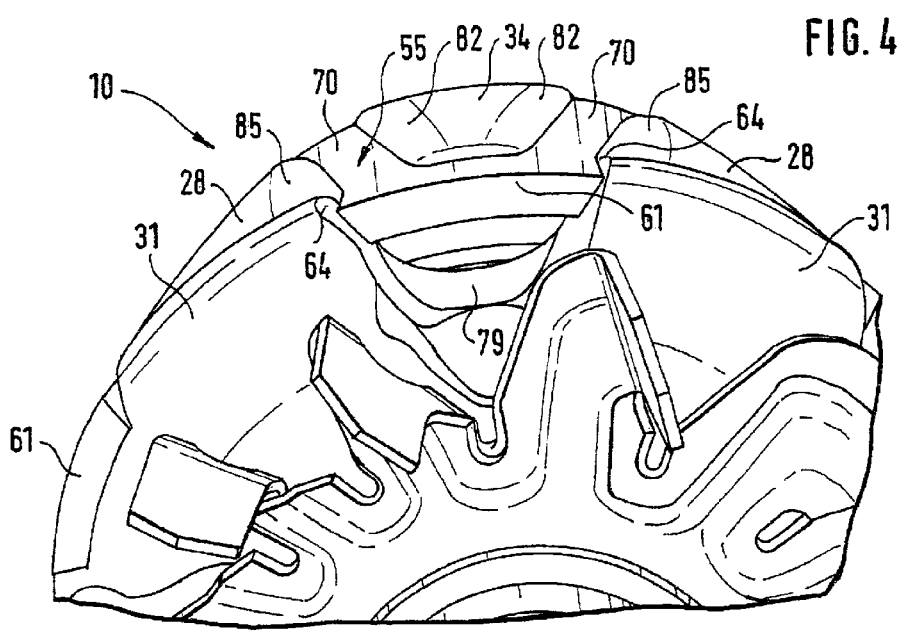

FIG. 4, an end view on the rotor with the pole closure.

DESCRIPTION OF THE EXEMPLARY EMBODIMENTS

Identical components or those functioning the same as each other are identified by the same reference numerals.

FIG. 1 shows the exemplary embodiment of a rotor 10 of the electrical machine of the invention. The rotor 10 is shown as a rotor of the claw pole type. The rotor has a pole wheel 13 and a counterpart pole wheel 16, both of which are secured to a rotor shaft 19. The pole wheel 13 and the counterpart pole wheel 16 are spaced apart by a rotor core 22. The pole wheel 13 comprises a pole wheel disk 25, at which the poles 28 originate. The poles 28 extend essentially in the axial direction of the rotor shaft 19. The poles 28 are integrally joined to the pole wheel 13 or pole wheel disk 25 via pole roots 31.

The design of the counterpart pole wheel 16 is the same as the design of the pole wheel 13. Counterpart poles 34 are integrally joined to the counterpart pole wheel disk 40 via counterpart pole roots 37. The pole roots 31 and counterpart pole roots 37 are the non-self-supported regions between the poles 28 and counterpart poles 34, respectively, and the pole wheel disk 25 and counterpart pole wheel disk 37. The counterpart poles 34 extend, like the poles 28, in the axial direction of the rotor shaft 19.

The individual poles 28 are spaced uniformed apart on the circumference of the rotor 10 and have pole gaps between individual poles 28. The counterpart poles 34 of the counterpart pole wheel 16 are likewise spaced apart uniformly on the circumference and form counterpart pole gaps. In the installed position, the pole wheel 13 and the counterpart pole wheel 16 are disposed such that the poles 28 of the pole wheel 13 protrude into the counterpart pole gaps of the counterpart pole wheel 16. Conversely, the counterpart poles 34 of the counterpart pole wheel 16 extend into the pole gaps of the pole wheel 13. The counterpart poles 34 and the poles 28 are furthermore also disposed with uniform spacing from one another. The poles 28 and counterpart poles 34 embrace an exciter coil 49, which is disposed in the axial direction between the pole wheel disk 25 and the counterpart pole wheel disk 40, on the one hand, and on the other in the radial direction between the rotor core 22 and the poles 28 and counterpart poles 34.

The aerodynamic properties of such a rotor 10 are poor, without a pole closure. The rotating rotor 10 and the numerous interstices or so-called pole gaps 52 experience a flow around them of by cooling air in operation. These pole gaps enable the air flowing around them to detach at the axial edges, disposed in the axial direction, of the poles 28 and counterpart poles 34. This develops an unordered flow, which is a cause of noise emissions of a rotor or generator.

By inserting a pole gap closure 55 into the pole gaps 52, it is no longer possible for a noise-generating flow to detach at the edges 58, extending approximately axially, of the poles 28 and counterpart poles 34. The pole gap closure 55 is braced with at least one of its axial end regions 61 via projections 64 on the pole roots 31 or counterpart pole roots 37; see also FIG. 2. The pole gap closure is braced on the counterpart pole roots 37 or pole roots 31. This means that the radially outward-acting centrifugal load originating at the pole gap closure 55 is conducted not via the counterpart poles 34 or poles 28 to the pole wheel 13 but rather via the projections 64 on the counterpart pole roots 37 and pole roots 31 to the pole wheel 13 or 16, respectively, without moment action. This means a considerable reduction in the load on the poles 28 or 34 and their counterpart poles 37 and pole roots 31, respectively, since this reduces the bending load of the counterpart pole roots 37 and pole roots 31.

To obtain a surface of the rotor 10 that is as unfissured as possible, the pole gap closure 55, in the region of the projections 64, has recesses 67 into which the projections 64 are fitted. The result is a substantially cylindrical surface of the rotor 10 comprising the outward-oriented surfaces of the pole gap closure 55, counterpart poles 34 and poles 28; see also FIG. 1 and FIG. 3.

The projections 64 are formed onto the pole wheel 13 and counterpart pole wheel 16 by means of a reshaping process. Alternatively, it is also possible to produce the projections 64 by metal-cutting machining of the pole roots 31 and counterpart pole roots 37.

The pole gap closure 55 shown in FIG. 3 has the end regions 61, already mentioned, which are joined to one another by means of bar-shaped regions 70. The bar-shaped regions 70 are adapted to the outer contour of the poles 28 and counterpart poles 34, as applicable. The stability of the pole gap closure 55 is enhanced because the bar-shaped regions 70 are joined together, on their radially inward-oriented side, by a ring 73. Still further enhancement of the stability of the pole gap closure 55 is obtained by providing that the end regions 61 are each joined to the ring 73 by a respective face element 76.

From the perspective view of the rotor 10 shown in FIG. 4, an installed position of the pole gap closure 55 can be seen. The end region 61 extends between two pole roots 31. The end region 61 has al relatively short radial length, so that between the end region 61 of the pole gap closure 55 and at least one throat 79 between two pole roots 31, an opening to a chamber radially inside the poles 28 and counterpart poles 34 is recessed out. The poles 28 and the counterpart poles 34 have so-called pole protrusions 82 and 85, respectively, as a result of which a transition between the radially outward-oriented surfaces of the pole gap closure 55 and the poles 28 and counterpart poles 34 is embodied in infinitely graduated fashion.

In a further exemplary embodiment, the pole gap closure 55 is braced not only on projections 64 on the counterpart pole roots 31 and pole roots 37 but furthermore on a radially inward-oriented underside of the pole 28 and counterpart pole 34, respectively, as well.

What is claimed is:

1. An electrical machine having a rotor (10), having an exciter system of electrically excited individual poles in the rotor (10), wherein said individual poles are electromagnetically excited poles (28) and counterpart poles (34), having a pole gap closure (55), inserted between the electromagnetically excited poles (28) and counterpart poles (34) that alternate on a circumference of the rotor (10), wherein said pole gap closure (55) at least partly fills open spaces, characterized in that the pole gap closure (55) is braced by at least one axial end region, via projections (64), on pole roots (31, 37), wherein the pole gap closure (55) has axial regions (61) having two peripheral sides, wherein each of said peripheral sides has a recess (67) formed therein, wherein said projections (64) are fitted into said recesses (67), whereby surfaces oriented outward of the pole gap closure (55), electromagnetically excited poles (28) and counterpart poles (34) result in an essentially cylindrical surface of the rotor (10) and wherein the at least one axial end region extends between two pole roots of one pole wheel.

2. The electrical machine of claim 1, characterized in that reshaped pole wheels (13, 16) form the projections (64).

3. The electrical machine of one of claim 1, characterized in that between at least one end region of the pole gap closure (55) and at least one throat (79) between two pole roots (31; 37), an opening to a chamber radially inside the poles (28) and counterpart poles (34) is recessed out.

4. The electrical machine of claim 1, characterized in that a transition between the surfaces of the pole gap closures (55) and the poles (28) and counterpart poles (34) is effected in infinitely graduated.

5. The electrical machine of claim 1, characterized in that the pole gap closure (55) has bar-shaped regions (70), which are joined to one another by a ring (37).

6. The electrical machine of claim 5, characterized in that at least one end region (61) is joined to the ring (73) by a face element (76).

7. The electrical machine of claim 6, characterized in that at least one face element (76) is braced on a radially inward-oriented underside of a pole (28) or counterpart pole (34).

* * * * *